Aug. 1, 1967    C. E. VALCHAR ET AL    3,333,935
METHOD OF AND APPARATUS FOR SHAPING GLASS SHEETS WITH
OPPOSED PRESSING MEMBERS
Filed Feb. 3, 1964    2 Sheets-Sheet 1
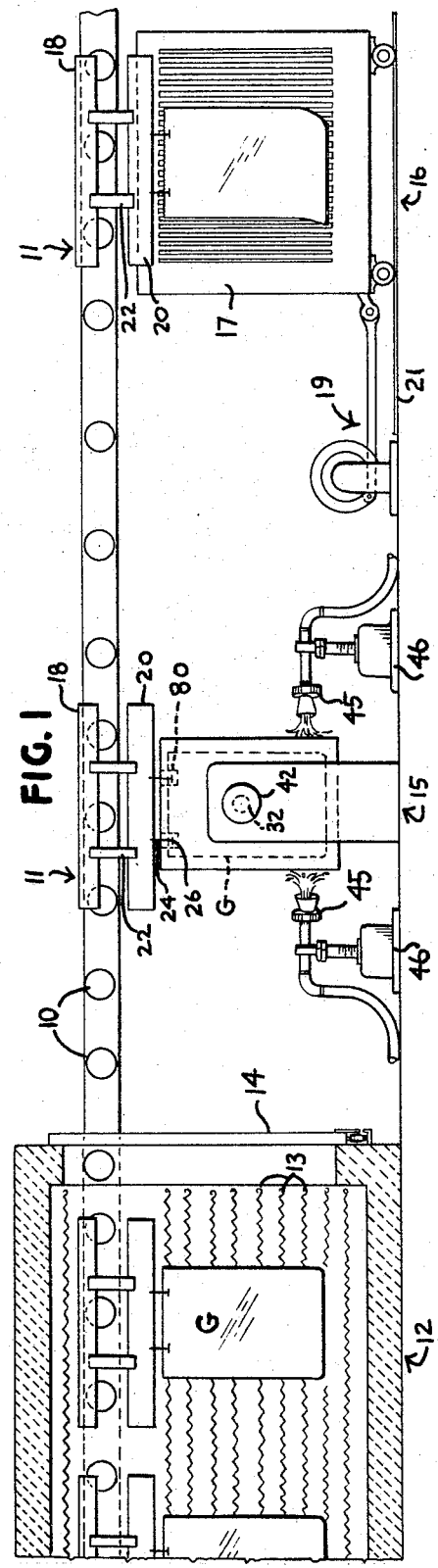
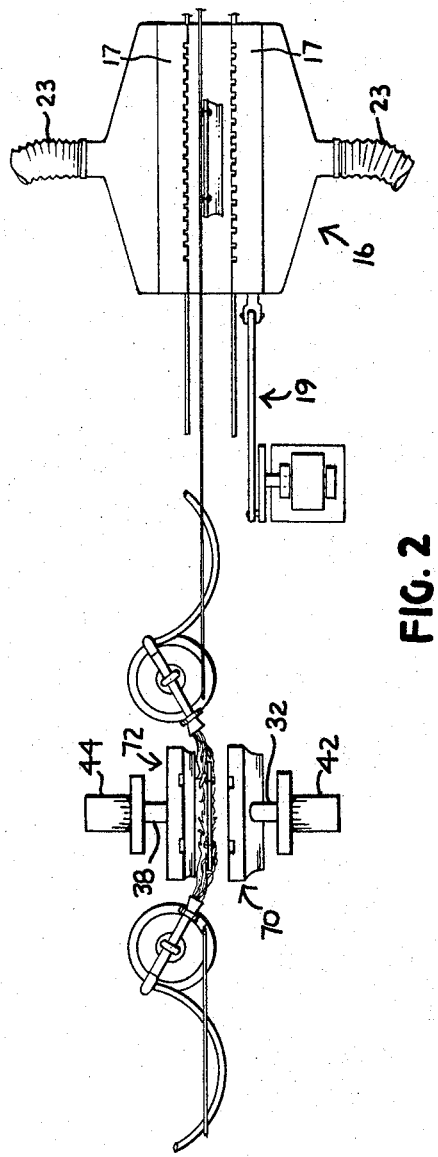
INVENTORS
CLEMENT E. VALCHAR and
STANLEY J. MROZINSKI
Oscar L. Spencer
ATTORNEY INVENTORS
CLEMENT E. VALCHAR and
STANLEY J. MROZINSKI

ATTORNEY

3,333,935
METHOD OF AND APPARATUS FOR SHAPING GLASS SHEETS WITH OPPOSED PRESSING MEMBERS

Clement E. Valchar, New Kensington, and Stanley J. Mrozinski, Natrona, Pa., assignors to Pittsburgh Plate Glass Company, Pittsburgh, Pa., a corporation of Pennsylvania
Filed Feb. 3, 1964, Ser. No. 342,014
5 Claims. (Cl. 65—106)

ABSTRACT OF THE DISCLOSURE

Shaping glass sheets to a non-uniform curvature including a sharply bent region comprising heating a sheet to shaping temperature within an enclosed atmosphere and shaping the sheet while still at shaping temperature outside said hot atmosphere, exposing the region to be sharply bent to high temperature gas outside said enclosed atmosphere to accentuate the heating in said region and engaging the opposite surfaces of the glass sheet while the sheet is at non-uniform temperature as a result of said heat accentuation.

---

Figure 3:
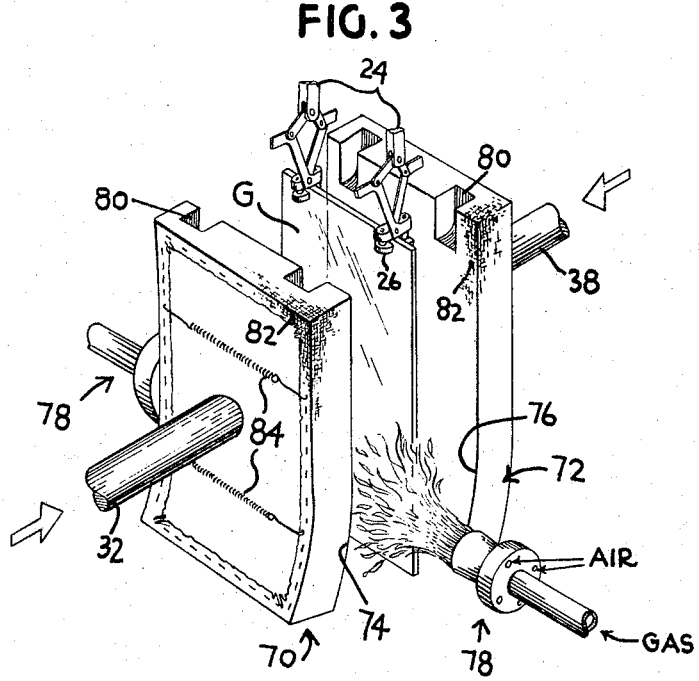

The present invention relates to shaping glass sheets and particularly refers to improvements in method and apparatus for shaping glass sheets wherein a heat-softened glass sheet is supported in spaced relation between two glass shaping members having complementary convex and concave shaping surfaces and wherein the glass is heat-softened and shaped by being sandwiched in pressurized contact between said shaping surfaces while in a heat-softened condition.

Glass sheets are usually shaped successively in a mass-production operation by heat-softening the glass sheets while conveyed in succession through a tunnel-like furnace. Thereafter the glass sheets are removed from the furnace and while still sufficiently hot to be deformed, the major surfaces of the heat-softened glass sheet are sandwiched in pressurized contact between a pair of glass shaping members having complementary convex and concave shaping surfaces opposing one another. Thereafter, the bent sheets may be quenched if desired while still at or above a temperature sufficient for tempering.

If it were practical to maintain the glass shaping members within the furnace, the glass sheet would be shaped while within the furnace. However, the elevated temperature of the furnace is sufficient to raise the glass to a temperature of about 1225 degrees Fahrenheit. At this elevated temperature, the fiber glass covers become worn quite rapidly and require frequent replacement. It is impossible to replace the fiber glass covers within the furnace unless the furnace operation is discontinued to enable access to the furnace.

Also, the bearings and other moving parts of the shaping members have a short life at furnace temperatures and require frequent replacement. Accordingly, a practical operation requires a glass shaping station to be outside the furnace.

It is also impractical to heat the shaping members to elevated temperatures because their great mass and high heat capacity requires much thermal input. Also, the fiber glass covers require frequent replacement when exposed continuously to high temperature.

For the above reasons, the glass sheets are shaped by pressurized contact with relatively cold, massive shaping members located outside the furnace. During this operation, and particularly during the shaping, the glass is supported in a substantially vertical position.

Several techniques have been employed for supporting glass in a vertical position. One type of support involves resting the bottom edge of the glass sheet on a series of spaced supports and loosely engaging the upper and/or side edges with a series of balancing elements in the form of loosely-fitting hairpin-type structures. Another technique involves gripping the glass near its upper edge by one or more sets of tong gripping elements. Still another technique involves supporting the bottom edge of the glass in the recesses of spaced glass conveyor elements which propel the glass in a forward direction while upward fluid blasts balance the glass between a pair of closely spaced walls.

Any of the above techniques or combinations thereof may be used in performing the present invention.

In press bending operations of the type described above, the temperature to which the glass is heated is very critical. If the glass is heated too hot within the furnace, the glass sheet becomes misshapen and distorted before it reaches a position between the glass shaping members. If the glass is not heated to a sufficiently high temperature, it may be chill-cracked during the shaping operation.

The present invention involves bending glass sheets to sharp curvatures where certain regions of the glass must be displaced a relatively large distance with respect to the plane occupied by the flat sheet compared to the displacement required for shallow bends. The maximum rate of deformation permitted increases with temperature. However, the glass must not be heated to too high a temperature in the furnace or it deforms.

The glass vents during shaping when it is deformed too rapidly for its temperature. This venting may be avoided by slowing the rate of glass deformation at any given temperature. A longer time is required to shape glass sheets to deep bends than for shallow bends at any temperature.

When glass sheets are bent to shapes having localized sharply bent areas, the additional time required for the glass to remain in contact with the cold, massive shaping members while certain regions are displaced from the flat to the deeply curved configuration may cause the glass surface to cool below a temperature sufficient for tempering. This causes "chill-cracking" to occur during quenching.

The main feature of this invention requires additional localized heating of the regions to be bent sharply to insure rapid flow of the glass from a flat to a sharply curved configuration. In other words, this aspect involves selective heating of certain glass regions only during its shaping.

The present invention in its broader aspect involves exposing at least a portion of the surface of the glass sheet to additional heating after its removal from the furnace. Preferably this would take place immediately before engaging the sheet in pressurized contact between the glass shaping members and should continue during the shaping and until the glass leaves the shaping station.

In the preferred embodiment, this is accomplished by directing hot gaseous products in an edgewise direction against at least a portion of the glass perimeter when the glass sheet is located between retracted glass shaping members. The hot gaseous products flow over the major surfaces of the glass, particularly the surface to be stretched from a flat to a convex configuration before, during, and after shaping.

The shaping members move away from the hot gaseous products when retracted. Thus, they cool somewhat between successive shaping operations. This intermittent cooling and the insulation provided by the fiber glass covering keeps the shaping members from being heated to the elevated temperatures they would attain in the furnace.

In addition, the intermittent exposure of the fiber glass covers permits them to cool also between shaping operations. This cooling following each contact with heat-softened glass results in longer life for the covers.

The additional heating that the glass sheet undergoes outside the furnace immediately before shaping eliminates the requirement for overheating the glass sheet while in the furnace. The additional heating compensates for the heat loss that takes place while the glass is transferred from the furnace to the shaping station. Therefore, the present invention minimizes the likelihood of causing distortion in the glass sheet while in the furnace to compensate for its heat loss during its transfer to the shaping station.

Furthermore, the exposure of the glass to burning gases and the products of combustion during the shaping operation heats the glass to bending temperature at the exact moment of bending. Also, the additional exposure of the bent sheet to the heated gases while the shaping members retract after the glass is shaped provides sufficient heat to raise the glass temperature to one sufficient for tempering even if the prolonged contact with the relatively cold, massive shaping members cools the glass to below tempering temperature during shaping.

The invention will be understood more clearly in the light of the description of certain embodiments which follows.

Figure 4:
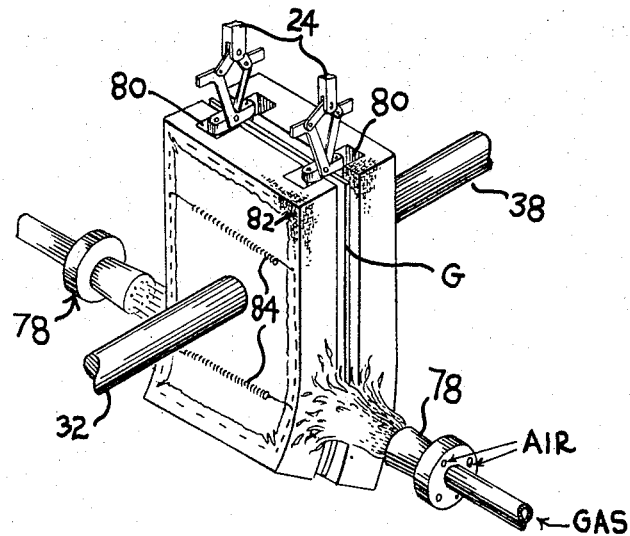

In the drawings which form part of the description and wherein like reference numerals refer to like structural elements, FIG. 1 is a longitudinal section of a portion of a continuous line for bending and tempering glass sheets modified according to the present invention;

FIG. 2 is a fragmentary plan view of the glass shaping station of FIG. 1 showing its relation to a tempering station;

FIG. 3 is a fragmentary perspective view of a particular embodiment of glass shaping apparatus particularly designed to bend glass sheets to a shape including a sharply bent end portion, showing the shaping members spaced from one another prior to moving into pressurized engagement against the opposite surfaces of a glass sheet supported therebetween; and FIG. 4 is a view similar to FIG. 3 showing the glass shaping members in pressurized contact against the opposite glass sheet surfaces.

Referring to the drawings, reference number 10 refers to the driving rolls of a conveyor for moving carriages 11 through a furnace 12 having electrical heating elements 13 mounted in its walls and an exit door 14, then through a glass shaping station 15, and finally through a glass tempering station 16. The conveyor continues through an unloading station (not shown). A return conveyor (not shown) is also provided for returning unloaded carriages to a loading station (not shown) in a manner well known in the art.

Each carriage 12 is composed of a cast iron alloy and comprises an upper beam 18 that rides on the conveyor rolls 10 and a lower beam 20 interconnected to the upper beam 18 by a pair of arcuately shaped vertically extending connecting rods 22. Glass gripping tongs 24 are suspended from the lower beams 20 of each carriage 12.

Each pair of tongs 24 has a pair of glass gripping elements 26 that apply opposing forces through the thickness of a glass sheet G to hang the glass sheet therefrom in a vertical plane. Preferably the glass gripping elements 26 are discs or disc-like members freely rotatable about axes extending vertically. U.S. Patent No. 3,089,727 to William J. Hay, Jr., shows such tongs.

Referring to FIG. 2, the glass shaping station 15 comprises a convex glass shaping member 70 having a convex shaping surface covered with a glass cloth cover 82. An actuating piston 32 is mounted to the rear of convex shaping member 70 to urge the latter to move along the axis defined by the length of the piston rod toward and away from a vertical plane occupied by the glass sheets G in succession at the glass shaping station 15.

On the other side of the vertical plane occupied by the glass sheets, the glass shaping station 15 comprises a concave glass shaping member 72. The latter has a concave shaping surface covered with a glass cloth cover 82. The concave shaping surface of glass shaping member 70 conforms to and is substantially complementary to the convex shaping surface of convex glass shaping member 72. Any slight difference in shape between the shaping surfaces permits the insertion of a glass sheet of finite thickness therebetween.

An actuating piston 38 is mounted to the rear of the concave glass forming member 70 to urge the latter to move along the axis defined by the length of the plunger of the piston 38.

Each of the glass shaping members 70 and 72 is notched at 80 so as to provide clearance to receive the glass gripping elements 26 of tongs 24 therebetween when the glass shaping members are in pressurized engagement against opposite sides of a glass sheet in a plastic state.

The glass shaping members 70 and 72 are composed of a heat resistant material such as a special cast iron product sold under the registered trademark of Meehanite by Rosedale Foundry of Verona, Pa. The shaping members are provided with a covering of fiber glass or asbestos or the like at their shaping surfaces. The covers for the glass shaping members 70 and 72 are preferably composed of knit fiber glass cloth composed of texturized yarns and having sufficient resiliency to yield under pressure as described and claimed in application Ser. No. 178,278 of James H. Cypher and Clement E. Valchar for Bending Glass Sheets filed Mar. 8, 1962, now U.S. Patent No. 3,148,968.

The pistons 32 and 38 are movably mounted within piston cylinders 42 and 44, respectively, to urge the glass shaping members 70 and 72 toward and away from mating engagement with one another. The piston cylinders 42 and 44 are rigidly attached to support structure for the glass shaping station.

The tempering station is typical of the prior art and may be constructed as any of the devices illustrated in U.S. Patent No. 2,131,406 to Leonardo Mosmieri and Gino Dal Pino.

The glass tempering station comprises a pair of plenum chambers 17 having apertured inner walls facing one another. The apertures are in the form of parallel elongated slots. The chambers 17 are connected together in a way that does not interfere with the movement of the glass sheets G and their supporting structure through the tempering station. A motor driven cam and cam shaft 19 is operatively connected to the plenum chambers 17 to cause the latter to reciprocate transverse to the length of the elongated slot apertures along guides 21. Air under pressure is furnished to the plenums from a compressor (not shown) through flexible conduits 23.

According to the present invention, a pair of gas burners 45 are mounted on stands 46 flanking the concave shaping member 72. The position and orientation of the flames from the gas burners 45 are adjusted so that the flames are directed obliquely inward against each vertical edge and toward the opposite vertical edge of a glass sheet when the latter is positioned between the shaping members 70 and 72.

The vertical position of the gas burners 45 is adjusted to have the combustion products move along the major surfaces of the glass sheet along the axis of sharpest bend defined by sharply bent portion 74 of the shaping surface of convex shaping member 70 and the complementary sharply bent portion 76 of concave shaping member 72 as seen clearly in FIG. 3. The orientation of the gas burners 45 is adjusted so that a major proportion of hot combustion products impinges on the major glass surface that is to be bent to a convex shape, that is the major surface facing the concave shaping member 72. A lesser amount of hot combustion products flows around the sheet edge and over the surface to be bent to a concave shape.

The present invention has found that this nonuniform application of localized heating to the opposite surfaces in the region of sharpest bending to be desirable because more heat is required to avoid breakage resulting from a tension stress established in the one glass surface extended from flat to convex configuration than is required to compress the other glass surface from flat to concave configuration. Glass must be heated more intensely in the sharply bent region to reduce its viscosity and permit rapid flow to the desired curved configuration. However, glass is weak in tension and strong in compression. The surface curved into a convex configuration is stressed in tension during said shaping while the opposite surface is stressed in compression. Therefore, care is taken to supply more heat to the surface that is to be stressed in tension than the surface that is to be stressed in compression in those regions where the glass is to be bent sharply.

In the embodiment disclosed in FIGS. 3 and 4, the glass sheets are bent to nonuniform curvatures to form rear quarter lights of station wagons. The shaping station only is shown schematically in this aspect of the operation.

Glass sheet G is shown in FIG. 3 suspended by tongs 24 between a convex shaping member 70 and a concave shaping member 72 having complementary shaping surfaces. The convex shaping surface of the convex shaping member 72 are provided with complementary sharply bent regions 74, 76, respectively, at their lower portion.

The glass sheet is oriented with one edge gripped by glass gripping elements 26. The gripped edge forms the leading vertical edge of the rear quarter light of the station wagon when installed.

The sheet is suspended from the tongs 24 with its length extending vertically and its region to be bent sharply near its bottom edge. Sharply bent regions 74 and 76 of the shaping members are brought into pressurized contact against the opposite surfaces of this region of the glass sheet during bending.

This embodiment of the present invention uses portable hand burners 78 applying the hot gaseous products through a burner orifice 79 to the opposite edges of the glass sheet region in alignment with the sharply bent regions 74 and 76 of complementary glass shaping members 70 and 72. The gaseous products from the burners extend over the major surfaces of the glass in this region. Particular effort is made to play the gaseous products over the surface that assumes a convex shape.

The shaping members 70 and 72 are notched at 80 to provide clearance for the glass gripping elements 26 of tongs 24. Their shaping surfaces are protected by fiber glass covers 82. The latter are composed of knit fiber glass cloth formed of texturized yarn lapped at its ends about rods interconnected by springs 84 with the overlap stapled about the interconnected rods.

EXAMPLE I

In this operation for press bending rear quarter lights for station wagons, glass sheets having ¼ inch thickness approximately 45⅛ inches long and 14 inches wide of polished plate glass were heated gradually for a period of about 4 minutes within the furnace to a surface temperature of about 1225 degrees Fahrenheit. During this heating, the glass sheets were conveyed through a tunnel-like furnace at a constant speed.

When the immediately preceding glass sheet had been shaped and the glass shaping members were being separated, the furnace exit door opened and the next sheet moved to the glass shaping station. About 5.7 seconds elapsed in moving the sheet from the furnace exit to its proper position at the glass shaping station in alignment between the glass shaping members.

When the glass sheet arrived at the glass shaping station, the burners 78 were directed onto the opposite vertical edge surfaces of the region to be bent to a sharp radius. Glass shaping members moved toward one another and into pressurized contact against the opposite surfaces of the softened glass sheet for about 5.3 seconds while the burners were directed to the opposite edges of the regions to be contacted by the sharply bent regions 74 and 76 of the shaping members 70 and 72.

The glass shaping members were held in pressurized contact of about 1 pound per square inch against the opposite surfaces of the glass sheet for about 2 seconds and then were retracted to permit the shaped glass sheet to move toward a quenching station and to provide clearance to receive the immediately subsequent glass sheet therebetween for the next glass shaping operation. It took 3.7 seconds for the glass sheet to travel from the glass shaping station to the quenching station.

Two commercial natural gas burners employing natural gas with an output of 1,000 British thermal units per hour were employed. The burners are 1¼ "Ventite Inspirators" No. 42 S.O. with "Sticktite" manufactured by the Maxom Premix Burner Company, Muncie, Ind.

Several illustrative embodiments of the present invention have been described for the purposes of illustration. Many equivalent operations will become obvious in the light of the present disclosure. For example, a glass sheet may be supported by supporting elements other than tongs during the press bending operation, such as the alternative support structures enumerated above. The glass may be heated in a so-called loft furnace wherein the furnace, the shaping station, and the quenching station are disposed in vertical alignment so that the glass sheet moves in a vertical direction between operations.

Reference to the scope of the present invention may be obtained from the claimed subject matter which follows.

What is claimed is:

1. In the art of bending a glass sheet into a shape having a sharply bent region offset from the center thereof by pressing said sheet between shaping members having complementary shaping surfaces conforming to the shape desired for the glass sheet after bending while said sheet is heat-softened, the improvement comprising supporting said glass sheet vertically and the region to be bent sharply disposed closer to the bottom end than to the upper end of said glass sheet, heating said sheet to shaping temperature within an enclosed hot atmosphere, removing said sheet from said enclosed atmosphere for shaping and, while outside said enclosed atmosphere, intensely heating said region to be sharply bent additionally by applying high temperature gas along said region to be sharply bent until said region is less viscous than the remainder of said glass sheet while said sheet is at elevated temperature and while supported in proper alignment between said shaping members, and immediately engaging said sheet in pressurized contact between said shaping members.

2. The improvement according to claim 1, wherein the exposure of said region is continued during and immediately after engaging said sheet.

3. The improvement according to claim 1, wherein the major surface of the glass sheet to be shaped to a convex curvature is directly exposed to said high temperature gas in said region to be bent sharply and engaged by one of said shaping members that has a concave shaping surface.

4. Apparatus for bending a glass sheet comprising a furnace, a pair of shaping members located outside said furnace and having complementary shaping surfaces conforming to the shape desired for the glass sheet after bending, each said surface including a sharply bent region disposed thereacross, means for supporting said glass sheet for movement into and out of said furnace and into and out of a position between said shaping members, means to bring said shaping members into pressurized contact against the opposite surfaces of said glass sheet when supported therebetween at said position and for withdrawing said shaping members from said pressurized contact, a gas burner, an orifice for said burner mounted adjacent to one of said shaping members and oriented to direct heat along a path intermediate said sharply bent regions disposed across said shaping surfaces for directing hot gaseous products from said burner along said path between said shaping members in a direction along said portion of the glass sheet to be bent sharply when said glass sheet is located at said position between said glass shaping members.

5. Apparatus as in claim 4, wherein said gas burner orifice is mounted to one side of said one of said glass shaping members, further including a second gas burner having an orifice mounted to the other side of and adjacent said one of said glass shaping members and oriented to direct heat in an opposing direction along said path for directing hot gaseous products from said second burner along said path in said opposing direction intermediate said sharply bent regions disposed across said complementary shaping surface.

References Cited

UNITED STATES PATENTS

| | | | |
|---|---|---|---|
| 1,332,724 | 3/1920 | Hill | 65—104 |
| 2,551,311 | 5/1951 | Batchell | 65—104 |

DONALL H. SYLVESTER, *Primary Examiner.*

A. D. KELLOGG, *Assistant Examiner.*